July 24, 1962  D. LEVIN  3,045,664
COOKING POTS
Filed Sept. 26, 1958

Inventor
David Levin
By
Watson, Cole, Grindle & Watson
Attorney

United States Patent Office 3,045,664
Patented July 24, 1962

3,045,664
COOKING POTS
David Levin, 308 Lucerne Mansions, De Villiers St., Johannesburg, Transvaal, Union of South Africa
Filed Sept. 26, 1958, Ser. No. 763,513
Claims priority, application Union of South Africa Oct. 9, 1957
1 Claim. (Cl. 126—390)

This invention relates to a cooking pot which has a heat insulating mat incorporated between the inside bottom of the pot and the outside of the pot in contact with the source of heat.

Many cooking pots are provided with a false bottom and may embody therein a heat insulating mat. In such constructions difficulty has been experienced in keeping the false bottom from warping, so that the pot no longer rests on a flat bottom and so does not bear evenly on a source of heat such as a smooth hot plate. It is the object of this invention to improve the construction of such pots to avoid the warping of the false bottom.

According to this invention a cooking pot is provided with a bottom in the form of a composite disc made up of insulating material encased between sheets of metal, a flanged ring for clamping the disc in position on the bottom of the pot, a clearance space for the expansion of the composite disc between said disc and the flanged ring.

In addition the invention provides for the metal of the disc forming the supporting surface for the pot to have a wide flat downwardly projecting annular portion.

More specifically in accordance with this invention a cooking pot is provided with a bottom cover in the form of a composite disc comprising a disc of sheet metal such as copper, a shallow central circular portion pressed upwardly therein, a disc of heat insulating material to fit on the inside of the pressed copper disc, a covering disc of metal such as aluminum, the assembled discs being secured together to form a composite disc by bending the edge of one disc over the other, a ring of insulating material between the bent edge and the bottom of the pot and an inwardly flanged ring encircling the disc, a space left between the disc and the ring to allow for expansion of the former and said ring adapted to be pressed onto the bottom periphery of the pot to hold the composite disc in position.

The invention further provides in the case of an enamelled pot, for the enamelling on the outside to terminate at the top of the flanged ring, and for the copper disc to be nickel plated except for the centrally depressed part.

Figure 1:
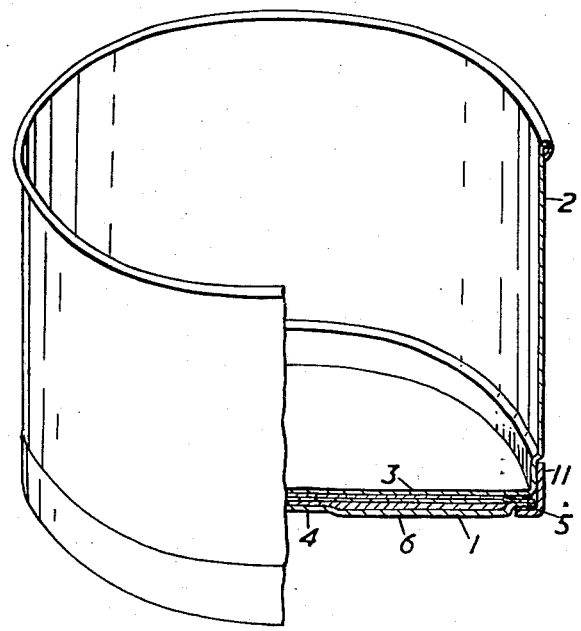

A cooking pot embodying a preferred form of the invention is shown in the accompanying drawing in which:

FIG. 1 is a perspective view of a pot in elevation and partly in section, and

Figure 2:
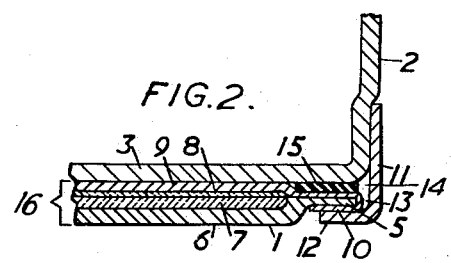

FIG. 2 an enlarged schematic view showing how the parts are assembled.

A disc 1 constituting a bottom cover for a cooking pot 2 is made from a circular sheet of copper preferably slightly smaller in diameter than the bottom 3 of the pot. The sheet 1 is pressed so as to press up a circular central portion 4 and a narrow circular strip 5 round the edge. This pressing will result in the formation of a wide annular band 6 on which the pot 2, to which it will be attached, can stand firmly.

The copper sheet of disc 1 is preferably nickel plated except for the centrally raised part 4. On the inside of the copper disc 1 there is placed a disc 7 of asbestos sheet covered if desired by a sheet 8 of fibre glass forming a covering of heat insulating material. These discs are shaped to provide a flat top surface which is covered by a disc 9 of sheet aluminum which latter may be large enough to allow its edge 10 to be beaded over to cover the heat insulating sheets and embrace the narrow circular strip 5 of the copper sheet of the disc 1.

The composite disc 16 above described, and consisting of copper, insulating material and aluminum closely associated to form one unit, is slightly smaller in diameter than the inside of a flanged metal ring 11 which has an internal diameter substantially equal to the outside diameter of the bottom of the pot 2.

The ring 11 is flanged inwardly, the flange 12 meeting the body of the ring 11 preferably in a curve 13. With the composite disc 16 placed in the ring 11 there is a clearance 14 all round the composite disc 16 between it and the wall of the ring 11. The flange of the ring 11 is easily accommodated against the beaded edge 10 pressed up round the edge of the copper disc 1 as described above. A ring of asbestos 15 is inserted to insulate the bottom 3 of the pot at the edge 10.

With the composite disc 16 in position in the ring 11 the latter is pressed in position onto the bottom 3 of the pot 2 so that the aluminum face of the disc 9 is held tightly against the bottom surface 3 of the pot 2 with the exception of the edge 10. If necessary the ring 11 may be heated before pressing to shrink it in position. In addition the top edge of the ring 11 may be spun into an annular depression made in the wall of the pot 2.

In use the pot 2 will stand on a heating surface on the flat wide annular band 6 of the nickel plated copper sheet of the disc 1, the centre 4 and the edges 5 being clear of the heating surface. The composite disc 16 itself is free to expand within the ring 11 and being built up as described will not buckle. It has been found also that whereas the heat often damages the bare copper in contact with the heat source the plating of it with nickel provides a good hard wearing surface which does not readily deteriorate under heat.

What I claim as new and desire to secure by Letters Patent is:

A cooking pot having a composite disc, resistant to warping at elevated temperatures covering the exterior bottom surface of said pot, said composite disc consisting of a sheet of copper, insulating material covering the top of said copper sheet, and an aluminum sheet covering said insulating material and beaded over the edge of said copper sheet; a ring of insulating material covering the top surface of said beaded edge; and an inwardly flanged ring secured to the side walls of said pot clamping said disc with said insulating ring in position, the periphery of said disc being spaced from the inner wall of said inwardly flanged ring.

References Cited in the file of this patent

UNITED STATES PATENTS

| 554,316 | Schneider | Feb. 11, 1896 |
| 1,519,766 | Demuth | Dec. 16, 1924 |
| 2,171,040 | Merritt et al. | Aug. 29, 1939 |
| 2,217,555 | Klusmeyer | Oct. 8, 1940 |
| 2,511,404 | Glenkey et al. | June 13, 1950 |
| 2,652,107 | Hughes | Sept. 15, 1953 |

FOREIGN PATENTS

| 388,911 | France | June 13, 1908 |
| 810,738 | France | Jan. 6, 1937 |
| 126,411 | Australia | Dec. 19, 1947 |